United States Patent Office 3,301,829
Patented Jan. 31, 1967

3,301,829
WATER SOLUBLE ESTERS OF HYDROXYL-CONTAINING MICELLE FORMING SURFACE ACTIVE COMPOUNDS
Fred E. Woodward, Watchung, N.J., and Richard A. Grifo, Easton, Pa., assignors to General Aniline & Film Corporation, New York, N.Y., a corporation of Delaware
No Drawing. Filed Mar. 2, 1962, Ser. No. 176,906
20 Claims. (Cl. 260—78.5)

This invention relates to new compositions of matter and to methods for making same, and in particular to water soluble esters of hydroxyl-containing micelle forming surface active compounds formed by the esterification of such surface active compounds with polymeric anhydrides.

It has now been discovered that new and valuable polymeric partial esters may be prepared which have outstanding and unusual properties, and especially are outstanding stabilizers and thickeners, particularly for aqueous systems. The polymeric esters which are herein contemplated are unique in that they must be prepared in a specific manner as hereinafter to be described.

It is therefore an object of the present invention to provide new and useful compositions of matter which have many outstanding uses.

It is still another object of the present invention to provide new and useful compositions which are derived from polymeric anhydrides and hydroxy containing surface active agents.

It is still another object of the present invention to provide new and useful compositions of matter which are water soluble partial esters of polymeric anhydrides.

It is still a further object of the present invention to provide new and useful compositions of matter which are partial esters derived from hydroxy containing micelle forming surface active compounds with polymeric anhydrides.

It is still another further object of the present invention to provide new and useful water soluble polymeric partial esters prepared from the interaction of hydroxy containing micelle forming surface active compounds and ethylenically unsaturated acid anhydrides.

It is still another object of the present invention to provide new and useful compositions of matter which result from the interaction of hydroxy containing micelle forming surface active compounds with α,β-unsaturated carboxylic acid anhydrides.

It is still another object of the present invention to provide processes whereby new and useful compositions of matter as described above may be prepared.

Other objects will appear hereinafter as the description proceeds.

The formation of the partial esters with which this invention is concerned must be carried out in such a manner that the polymeric anhydride is not in contact with water except when there is also present surface active hydroxy compounds. In other words, where water is used as the reaction solvent medium, the anhydride must be added to the hydroxy compound in the water solution, the hydroxy compound at a concentration greater than its critical micelle concentration, or alternatively, the solution of hydroxy compound may be added to the anhydride. Where a non-reactive polymer solvent is used, such as acetone, either reactant may be in solution, or both may be in solution and either may be added to the other.

The water-soluble esters herein contemplated contain up to about 5 mole percent of the carboxyl groups available in the polymeric anhydride as ester groups and preferably no more than about 3 mole percent as esters.

The hydroxyl-containing micelle forming surface active agents comprise the non-ionic hydroxyl containing compounds as well as anionics containing an hydroxyl grouping. The micelle forming surface active agents are well-known and as illustrative of the hydroxyl-containing compounds, mention may be made of the following:

(A) Alkylene oxide condensation products with an active hydrogen-containing hydrophobe.

The alkylene oxide condensates are prepared from an alkylene oxide or a precursor thereof and a hydrophobe containing an active hydrogen. The alkylene oxides include precursors as well having from 2 to 4 carbon atoms such as ethylene oxide, propylene oxide, butylene oxide, butylene dioxide, epichlorohydrin, isobutylene oxide and the like. Mixtures of such oxyalkylating reagents may also be used simultaneously or in sequence. Examples of such products may be found in U.S. Patents 1,970,578, directed to derivatives of carboxylic acids, alcohols and amines; 2,085,706, directed to derivatives of amides; 2,205,021, directed to derivatives of mercaptans; and 2,213,477, directed to derivatives of ring substituted isocyclic hydroxyl compounds. The number of oxyalkyl groups may range from 1 to about 200 or more.

The following illustrate typical reactive-hydrogen compounds:

nonylphenol (propylene trimer)
octylphenol (diisobutylene)
dodecylphenol (propylene tetramer)
diamylphenol
dibutylphenol
alkylphenols, where alkyl is $C_4$ to $C_{18}$
alkyl cresols, where alkyl is $C_4$ to $C_{18}$
mixed "coco" alcohols
lauryl alcohol (85% $C_{12}$ alcohol)
castor oil
lauryl alcohol (92% $C_{12}$ alcohol)
tridecyl (oxo) alcohol
oleyl alcohol
hydrogenated tallow alcohol
R—OH prepared from olefins of $C_{12}$ to $C_{22}$ by the "oxo" process, i.e., addition of $H_2C=O$ and hydrogenation to the alcohol R—OH where R=$C_8$ to $C_{22}$

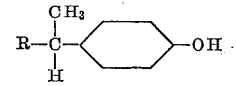

where R=n—$C_4H_9$ to n—$C_{22}H_{45}$

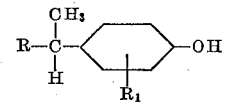

where R=n—$C_4H_9$ to n—$C_{22}H_{45}$

R—SH $R_1$=$C_8$ to $C_{22}$

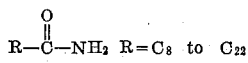

R—$SO_2NH_2$ R=$C_8$ to $C_{14}$

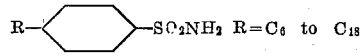

polypropylene oxide of MW about 800 to about 2500
$H_2N$—$CH_2CH_2NH_2$+propylene oxide to MW 800 to 2500 X—$NH_2$ or $X(NH)_2$+propylene oxide to MW 800 to 2500
X—OH or X—$(OH)_2$+propylene oxide to MW 800 to 2500
X=residue of active hydrogen compound (B) Alkylolamine condensation products with fatty acids or esters. Suitable alkylolamines include:

diethanolamine
monoethanolamine
isopropanolamine
di-n-propanolamine (C) Glycol and polyol esters of fatty acids.

(D) Anionic surface active agents containing hydroxyls, e.g.,
(1) sodium salt of α-hydroxy stearic acid
(2) sulfated fatty acid esters of glycols and polyols
(3) alkali salts of sulfate ester of (B)
(4) oleyl alcohol sulfate

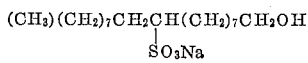

(5) salts of ricinoleic acid, and the like

The polymeric anhydrides which are herein contemplated are interpolymers of at least one ethylenically unsaturated monomer with an anhydride containing an ethylenic linkage. The preferred anhydrides are the α,β-unsaturated dicarboxylic acid anhydrides and particularly those of the maleic anhydride series having the formula:

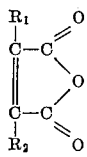

wherein $R_1$ and $R_2$ are independently selected from the group consisting of hydrogen, halogen, alkyl, aryl, aralkyl, substituted alkyl, aryl or aralkyl, or —$SO_3H$.

Examples of such compounds are:

maleic anhydride
chloromaleic anhydride
citraconic anhydride (methyl maleic)
fumaric anhydride
mesaconic anhydride
phenyl maleic anhydride
benzyl maleic anhydride
sulfomaleic anhydride
aconitic anhydride In addition, other unsaturated anhydrides such as itaconic
methylene malonic
allyl succinic,
and the like may be used.

The copolymerizable monomers containing a >C=$CH_2$ group which may be employed with the above described anhydride include all of the known ethylenically unsaturated copolymerizable compounds such as:

vinyl ethers, e.g.,
    vinyl methyl ether
    vinyl ethyl ether
    vinyl n-propyl ether
    vinyl iso-propyl ether
    vinyl n-butyl ether
    vinyl iso-butyl ether
    vinyl iso-octyl ether
    vinyl phenyl ether
    α-chlorovinyl phenyl ether
    vinyl β-naphthyl ether
vinyl esters, e.g.,
    vinyl acetate
    vinyl propionate
    vinyl butyrate
    vinyl caproate
    vinyl stearate, etc.

vinyl halides, e.g.,
    vinyl chloride
    vinyl fluoride
    vinyl bromide
acrylic acid and esters, e.g.,
    methyl acrylate
    ethyl acrylate
    propyl acrylate
acrylic acid derivatives, e.g.,
    methacrylic acid and esters
    α-haloacrylic acid and esters
    acrylonitrile
    methacrylonitrile
    acrylamide
    methacrylamide
    N-alkyl acrylamides
    N-aryl acrylamides
N-vinyl heterocycles, e.g.,
    N-vinyl pyrrolidone
    N-vinyl-3-morpholinones
    N-vinyl-oxazolidone
    N-vinyl-imidazole
styrene
alkyl sytrenes, e.g., α-methyl styrene
vinylidene chloride
vinyl ketones, e.g., methyl vinyl ketone
olefins such as
    ethylene
    propylene
    isobutylene
    butene-1
2,4,4-trimethyl pentene-1
hexene-1
3-methyl-butene-1, and the like The anhydride-ethylenically unsaturated interpolymers preferably contain the two moieties in equimolar amounts whereby the repeating unit in the interpolymer contains 1 anhydride and 1 comonomer moiety.

Examples of specific interpolymers which may be employed are:

vinyl methyl ether-maleic anhydride
vinyl ethyl ether-maleic anhydride
styrene-maleic anhydride
α-methyl styrene-maleic anhydride
ethylene-maleic anhydride
vinyl methyl ether-citraconic anhydride
vinyl methyl ether-itaconic anhydride
vinyl methyl ether-chlormaleic anhydride
vinyl chloride-maleic anhydride
vinyl acetate-maleic anhydride
vinyl chloride-vinyl acetate-maleic anhydride
styrene-vinyl acetate-maleic anhydride The interpolymers above described may vary in molecular weights from as low as about 400 to several million (e.g., 2,000,000) or more. Viscosity measurements are commonly used as an indication of the average molecular weight of the polymeric composition. The K value (Fikentscher) of any particular mixture of polymers is caluculated from viscosity data and is useful as an indication of the average molecular weight of such mixture. Its determination is fully described in "Modern Plastics," 23, No. 3, 157–61, 212, 214, 216, 218 (1945) and is defined as 1000 times $k$ in the empirical relative viscosity equation:

$$\log_{10}\eta\text{-el} = \frac{75k^2}{1+1.5k_C} + k$$

wherein C is the concentration in grams per hundred cc. of polymer solution and $\eta_{rel}$ is the ratio of the viscosity of the solution to that of pure solvent. The K values are reported as 1000 times the calculated viscosity coefficient in order to avoid the use of decimals. The preferred interpolymers employed in the present invention have K values of from about 10 to about 200.

K values and specific viscosities ($\eta_{sp}$) are interconvertible and are related through relative viscosity ($\eta_{rel}$). Thus, when viscosity measurements are taken on solutions which have a concentration of 1.00 gram of polymer per deciliter of solution at 25° C. ($C=1$), the relationships are as follows:

$$\eta_{rel} = \eta_{sp} + 1$$

Relative viscosity=specific viscosity plus one.
Relative viscosity=$10^{(0.001K+0.000075K^2/(1+0.0015K))}$
Hence $\eta_{sp} = -1 + 10^{(0.001K+0.000075K^2/(1+0.0015K))}$ Relative viscosity, specific viscosity and K are dimensionless, where inherent viscosity $$\frac{(\log_e \eta_{rel})}{C}$$

and intrinsic viscosity (the limit of inherent viscosity as C approaches zero) have the dimensions of dilution, i.e., the reciprocal of concentration. Intrinsic viscosity and K are intended to be independent of concentration. The preferred interpolymers are those having a specific viscosity ranging from about 0.1 to about 4.5.

As pointed out above, one of the general methods for preparing the partial esters of the present invention involves the addition of the polymeric anhydride to an aqueous solution of the hydroxy-containing surface active agent. The concentration of the latter must be above the critical micelle concentration (CMC). A general theory for micelle formation by nonionic surface active agents may be found in the Journal of Physical Chemistry, vol. 60 (1956), page 257. For practical and economical reasons the amount of water present should not be greater than about 99.75%, i.e., 0.25% reactants. The minimum water content again is governed primarily by viscosity considerations relating to handling problems. It is, however, desirable to maintain a minimum water content of about 2%. The preferred range of water is from about 8% to about 98%. In preparing the partial esters a second variable is the ratio of polymeric anhydride to surface-active agent. Again, this may vary widely. As little as about 0.01% on a molar basis of surface active agent per mole of interpolymer yields partial esters of outstanding properties. There is no upper limit of surface active agent in aqueous systems since water soluble products always form and excess surfactant usually acts as a diluent. On the weight the ratios will, of course, vary depending upon the particular surface active agent and interpolymer. A general guide, however, may be given wherein the interpolymer to surface active agent ratio varies from a maximum of about 99.98:0.02 and preferably about 99.95:0.05.

In non-aqueous systems the lower limit of surfactant is similar to that of the aqueous system but there is an upper limit of surface active agent which is about 1.5 to 2 moles thereof per mole of interpolymer.

Another technique for preparing the partial esters of this invention using an aqueous system involves intermingling sprays of dry interpolymer with surface active agent containing a minor amount of water (e.g., as low as 0.5%). This technique permits the direct formulation in the substantially dry state of partial ester. Where the surface active agent is a liquid it is also possible to employ large excesses thereof (e.g., 100 times by weight based on interpolymer) to yield a liquid surface active composition containing a minor but essential amount of partial ester which composition can be used directly in formulating compositions where the surface active agent is to be added. This is especially so in preparing heavy duty liquid detergent formulations which may contain, for example, 10% surface active agent. Of course, such excess amounts of surface active agent may also be used where the agent is a solid and the same benefits described above will accrue.

The following examples will serve to illustrate the present invention without being deemed limitative thereof. Parts are by weight unless otherwise indicated.

Example 1

(A) 5.0 g. of a vinyl methyl ether-maleic anhydride interpolymer (mole ratio 1:1; specific viscosity=1.6 measured as a 1 g. sample per 100 ml. of solution in 2-butanone at 25° C.) is dissolved in 90 g. of water at room temperature. To this is added 5.0 g. of a nonyl phenol+6 moles of ethylene oxide surface active condensation product. The resultant product has a viscosity of 600 centipoises (cps.) which drops to 100 cps. after 14 days.

(B) Operating at room temperature (about 25° C.) 5.0 g. of the surface active product of (A) is dissolved in 90 g. of water and 5.0 g. of the same interpolymer powder as in (A) is then added. After dissolution (18 hours) the product is found to have a viscosity of >100,000 and after 14 days the viscosity is substantially unchanged. This product contains about 0.7% ester groups determined by ultra-violet spectophotometry of chloroform extracted product.

(C) 5.0 g. of the interpolymer in 95 g. water at room temperature has a viscosity of about 600 cps.

(D) From the above it is evident that in (B) a new composition has been produced as shown by the increase in viscosity as well as the presence of non-extractable hydroxy compound bound as an ester to the polymeric anhydride.

Example 2

Example 1–B is repeated except that the mixture is heated to 85–90° C. The reaction and complete solution is effected in 1 hour. A similar product is produced.

Example 3

Example 1–B is repeated employing 5.0 g. of the indicated hydroxy-containing surface active agents:

| Agent: | Mol ratio (anhydride to agent) |
|---|---|
| (A) nonyl phenol+4 E.O.[1] | 1:0.4 |
| (B) nonyl phenol+9 E.O. | 1:0.25 |
| (C) tridecyl alcohol+6 E.O. | 1:0.33 |
| (D) dinonyl phenol+17.3 E.O. | 1:0.14 |
| (E) dinonyl phenol+150 E.O. | 1:0.02 |
| (F) nonyl phenol+10 E.O. | 1:0.24 |
| (G) dinonyl phenol+15 E.O. | 1:0.15 |
| (H) lauric diethanolamide | 1:0.5 |

[1] Ethylene oxide.

The products A–H produce very viscous solutions (>100,000 cps.) and product H in particular is a stiff gel. Lauric diethanolamide as a 5% solution in water has a viscosity of 60 cps.; as a 10% solution the viscosity is 310 cps.

Product F is extracted with chloroform, dissolved in acetone and reprecipitated with chloroform. This procedure is repeated several times and the product is then vacuum dried. The dried polymer is redissolved in water and found by its ultra-violet absorption curve to contain 3.75% of the surface active agent. This corresponds to about 0.5% of the carboxyl groups of the polymer anhydride in the form of ester groups.

Example 4

(A) A 0.05 m./100 ml. of solution in acetone of vinyl methyl ether-maleic anhydride copolymer (1:1 mole ratio) having specific viscosity of 1.6 is prepared.

(B) A 0.1 m./100 ml. of solution in acetone of a nonyl phenol+10 moles of ethylene oxide surface active condensation product is prepared.

(C) 83 ml. of solution B is then mixed with 166 ml. of solution A (ratio of reactants on a molar basis is 1:1) at room temperature and held there for about 72 hours. From the solution (about 250 cc.) the acetone is volatilized at room temperature and then extracted seven times with 150 ml. of chloroform, each time the mixture is shaken for 1 hour, and filtered. The residue is dried in a vacuum at room temperature. The extraction removes unreacted surface active hydroxy compound. The final product is found by ultra-violet and infra-red analysis to contain 14.9% by weight of hydroxy surfactant bound as ester to the interpolymer. Based on the unit weights of the reactants (156 and 660), this calculates to 1 surfactant moiety for each 23.2 anhydride units or about 4.3% OH groups per anhydride moiety. Again, this is about 2.2% OH groups per potential carboxyl group (i.e., 2.2% of COOH groups as ester groups). A 10% aqueous solution of the reaction product has a viscosity of greater than 100,000 cps. (i.e., product after extraction).

Example 5

Example 4 is repeated except that 200 ml. of maleic copolymer solution is mixed with 50 ml. of surfactant solution (mole ratio is 2:1). The final product contains 1 hydroxy moiety for each 55.7 units of interpolymer or 0.9% of the carboxyls present as ester groups. This product gives viscosities in water similar to the product of Example 4, after extraction.

Example 6

Example 4 is again repeated except that 222 ml. of solution A (0.111 mole of copolymer) is mixed with 28 ml. of solution B (0.028 mole surfactant). The mole ratio of reactants is 4:1. The final product contains 1 surfactant (i.e., OH) moiety for each 136 units of maleic anhydride interpolymer or 0.37% of the carboxyls are present as ester groups. The viscosity in water for a 10% solution is about 100,000 cps.

Example 7

Example 4 is once again repeated employing 238 ml. of solution A (0.12 mole of copolymer) and 12 ml. of solution B (0.012 mole of surfactant). The ratio on a mole basis is 10:1. The final product contains 1% surfactant bound to the copolymer or 1 surfactant moiety for each 365 units of maleic anhydride copolymer. This is equivalent to about 0.14% of the carboxyls as ester groups.

Example 8

Example 4 is again repeated using 142.8 ml. of solution A (0.071 mole of copolymer) and 107.2 ml. of solution B (0.107 mole of surfactant). The ratio of reactants on a mole basis is 1:1.5. The final product contains 1 surfactant moiety for each 10 units of copolymer, or 5% of the total potential COOH groups present as ester. This product is difficultly soluble in water and gives equivalent high viscosities as the previous products.

Example 9

Example 1–B is repeated employing 9.9 g. of surface active agent in 90 g. of water and adding thereto 0.1 g. of interpolymer. The final product (after extraction as in Example 4) contains 2% of the potential carboxyl groups as ester groups. This product is water-soluble.

Example 10

Example 9 is repeated except that the mixture is treated as in Example 2. The final product after extraction contains about 3% ester groups.

Example 11

Example 9 is repeated employing the surface active agents of 3–A through 3–F.

Example 12

Example 1 is repeated employing 9.95 g. of interpolymer and 0.05 g. of surface active agent (weight ratio 199:1; mole ratio 1:0.0016). A water-soluble product of greatly increased viscosity is formed.

Example 13

Example 1 is again repeated employing 9.75 g. of interpolymer and 0.25 g. of surface active agent (weight ratio about 47:1; mole ratio 1:0.008). The viscosity is about 24,000 cps.

Example 14

Example 1 is again repeated using the following weight ratios of interpolymer to surface active agent: (A) 19:1, (B) 7:1, (C) 3:1. In each instance the viscosities are greater than 100,000 cps.

Example 15

Example 1 is again repeated employing ratios of interpolymer to surface active agent of 1:3 and 1:7. A greatly increased viscosity results.

Example 16

Example 1 is repeated employing interpolymer having a viscosity characteristic of (a) 0.1 to 0.5 and (b) 2.5 to 3.5. Greatly increased viscosity remains very stable.

Example 17

Operating at room temperature (about 25° C.), 38 g. of vinyl methyl ether-maleic anhydride interpolymer (mole ratio 1:1; specific viscosity 1.6) is added to a solution of 2 grams of a surface active product (made by reacting nonyl phenol with 10 moles of ethylene oxide) in 60 g. of water. The product becomes extremely viscous.

2.5 g. of the above reaction product is added to the following liquid detergent formulation:

(A)

| | G. |
|---|---|
| Water | 62.5 |
| Nonyl phenol + 10 moles ethylene oxide surfactant | 10.0 |
| Tetrapotassium pyrophosphate | 25.0 |

The pH of finished formulation A is 8.9, the viscosity is 1100 cps. and the resulting emulsion is completely stable after 100 minutes in a centrifuge at 500 r.p.m. and overnight there is still 100% emulsion stability.

Example 18

Example 17 is repeated except that the reaction product is prepared from 39.6 g. of interpolymer and 0.4 g. of surface active agent. In finished formulation A the pH is 8.7, the viscosity 200 cps. and the stability similar to Example 17.

Example 19

Example 18 is repeated except that the reaction product is added to a liquid detergent of the following composition:

FORMULATION B

| | G. |
|---|---|
| Water | 40 |
| Carboxymethyl cellulose (5% solution in water) | 10 |
| KOH | 2 |
| Sodium silicate-$H_2O$ solution (36% solids) | 10 |
| Surface active agent of Formulation A | 10 |
| Tetrapotassium pyrophosphate | 25 |

The pH of the finished formulation is 11.9, viscosity 1600 cps. and stability as in Examples 17 and 18.

In the absence of the reaction product the formulations A and B after 15 minutes on the centrifuge have only 10% emulsion. With 1.0% interpolymer (unreacted), the stability of the emulsion is only 25% after 15 minutes in the centrifuge.

Example 20

79.2 g. of interpolymer as used in Example 1 is added in 1 minute to 320 g. of water containing 0.8 g. of a surface active agent prepared from nonyl phenol plus 15 moles of ethylene oxide. Temperature is 87° C. The mixture is stirred for 45 minutes. The final product contains 0.32% ester groups.

Example 21

A solution of 0.2 g. of the surface active agent of Example 20 in 4.6 g. of water is added to 20 g. of the interpolymer of Example 1 and agitated in a small Werner- Pfleiderer mill overnight. A dry reaction product is produced.

Example 22

Example 1–B is again repeated employing a castor oil plus 20 moles ethylene oxide condensate as the surface active material.

Example 23

Example 22 is repeated except that the condensate is with 30 moles of ethylene oxide.

Example 24

Example 22 is again repeated except that the condensate is with 40 moles of ethylene oxide.

Example 25

Example 1–B is repeated employing as the surface active agent the sodium salt of α-hydroxystearic acid.

Example 26

Example 1–B is repeated employing the following surface active compounds.

(A) 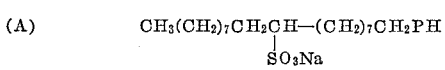

(B) sodium salt of ricinoleic acid
(C) polypropylene oxide MW 800 plus 10 moles ethylene oxide
(D) nonyl phenol plus 10 moles propylene oxide, then 10 moles ethylene oxide

Example 27

Example 1–B is repeated except that the interpolymer is replaced by the following:

(A) chloromaleic anhydride-vinyl methyl ether (K=30)
(B) chloromaleic anhydride-vinyl methyl ether (K=60)
(C) citraconic anhydride-vinyl methyl ether (K=40)
(D) methylene malonic anhydride-vinyl methyl ether (K=20)
(E) benzyl maleic anhydride-vinyl methyl ether (K=35)
(F) maleic anhydride-vinyl ethyl ether (K=20)
(G) maleic anhydride-vinyl ethyl ether (K=90)
(H) maleic anhydride-vinyl isobutyl ether (K=40)
(I) maleic anhydride-vinyl acetate
(J) maleic anhydride-vinyl stearate
(K) maleic anhydride-vinyl chloride
(L) maleic anhydride-methyl acrylate
(M) maleic anhydride-acrylonitrile
(N) maleic anhydride-N-vinyl pyrrolidone
(O) maleic anhydride-styrene (M.W.=2300)
(P) maleic anhydride-ethylene (s.p. vis. 1.0–1% in dimethyl formamide)
(Q) maleic anhydride-propylene
(R) maleic anhydride-styrene-vinyl acetate In each of the Examples 27–A through 27–R the monomers are present in equimolar amounts.

Example 28

An ethylene-maleic anhydride surface active partial ester is prepared as in Example 17 (i.e., ratio 99:1). The ethylene-maleic copolymer used is Monsanto DX 840–21 (specific viscosity 0.6). This partial ester (1% active) is incorporated into formulation B (Example 19). The resultant emulsion composition has a viscosity of 120 cps. and is stable.

Example 29

Example 28 is repeated except that the anhydride copolymer is a styrene-maleic anhydride copolymer of M.W.=2300.

Example 30

Example 29 is repeated using a copolymer having a molecular weight of 5000.

Example 31

A heavy duty liquid detergent composition is prepared as follows:

(A) To a solution of 0.05 g. of a nonyl phenol plus 15 moles of ethylene oxide condensate (surface active agent) in 7.5 g. of water are added 4.95 g. of a vinyl methyl ether-maleic anhydride copolymer (1:1 ratio; specific viscosity=1.6). The mixture is stirred while being heated on a steam bath for 45 minutes and then 153 g. of water are added and the reaction mixture stirred until solution is complete.

(B) There are then added:

| | G. |
|---|---|
| 1% aqueous solution of Blancophor RG–96 (brightener) | 50.5 |
| 5% aqueous solution of a low viscosity carboxymethylcellulose | 50 |
| KOH | 9 |
| 36% aqueous sodium silicate | 50 |
| Nonyl phenol+10 moles ethylene oxide surface active condensation product | 50 |
| Tetrapotassium pyrophosphate | 125 |

The resultant composition has a pH of 12 and is a readily pourable emulsion of excellent stability. Viscosity=400 cps.

Example 32

Example 31 is repeated except that the partial ester stabilizer is reduced to 0.75% active in the final composition, employing 3.75 g. of anhydride copolymer and 0.0038 g. of surfactant.

Example 33

A stabilizer (partial ester) is prepared as in Example 31–A. There are then added the same ingredients as in Example 31–B except in place of the 50 g. of nonyl phenol+10 moles of ethylene oxide condensate, there are used 40 g. of the sodium salt of the sulfate ester of nonyl phenol+6 moles of ethylene oxide and 10 g. of lauric diethanolamide. This results in a stable emulsion similar to Example 31 but containing a major amount of an anionic surfactant.

The compositions of the present invention have been specifically described as outstanding thickeners for aqueous systems and stabilizers for aqueous emulsion systems, particularly of the heavy duty liquid detergent type. In addition, such compositions may be used to stabilize aqueous emulsions and suspensions in general, e.g., oil emulsions, insecticidal, biocidal, cosmetic and pharmaceutical emulsions and suspensions, and the like. These compositions may be used as adhesives for laminating plastics to plastics, plastics to textiles, plastics to metals, etc. The compositions of this invention may be used as thickeners for various latex compositions, in drilling muds and as a flocculating agent in paper manufacture.

Other variations in and modifications of the described processes which will be obvious to those skilled in the art can be made in this invention without departing from the scope or spirit thereof.

We claim:
1. A composition comprising a water-soluble partial ester of:
   (1) an hydroxyl-containing micelle-forming surface active agent selected from the group consisting of anionic surface active agents, alkylene oxide condensation products with an active hydrogen-containing hydrophobe, alkylolamine condensation products with fatty acids, alkylolamine condensation products with fatty esters, and glycol and polyesters of fatty acids and
   (2) an alkali-soluble interpolymer of an ethylenically unsaturated carboxylic acid anhydride with a terminal ethylenically unsaturated monomer selected from the group consisting of vinyl ethers, vinyl esters and α-olefins, said partial ester containing not more than about 5% of the carboxyl groups present as ester groups.

2. A composition comprising a water-soluble partial ester of:
   (1) an hydroxyl-containing micelle-forming surface active agent selected from the group consisting of anionic surface active agents, alkylene oxide condensation products with an active hydrogen-containing hydrophobe, alkylolamine condensation products with fatty acids, alkylolamine condensation products with fatty esters, and glycol and polyesters of fatty acids and
   (2) an alkali-soluble interpolymer of an $\alpha,\beta$-unsaturated carboxylic acid anhydride with a terminal ethylenically unsaturated monomer selected from the group consisting of vinyl ethers, vinyl esters and $\alpha$-olefins,
said partial ester containing not more than about 5% of the carboxyl groups present as ester groups.

3. A composition as defined in claim 2 wherein the anhydride is maleic anhydride.

4. A composition as defined in claim 3 wherein the monomer is an alkyl vinyl ether.

5. A composition as defined in claim 4 wherein the monomer is methyl vinyl ether.

6. A composition as defined in claim 3 wherein the monomer is an olefin.

7. A composition as defined in claim 6 wherein the olefin is ethylene.

8. A composition as defined in claim 3 wherein the monomer is styrene.

9. A composition as defined in claim 3 wherein the monomer is a vinyl ester.

10. A composition as defined in claim 3 wherein the monomer is an acrylic acid derivative.

11. A composition comprising a water-soluble partial ester of:
    (1) a micelle-forming hydroxyl-containing non-ionic surface active agent selected from the group consisting of alkylene oxide condensation products with an active hydrogen-containing hydrophobe, alkylolamine condensation products with fatty acids, alkylolamine condensation products with fatty esters, and glycol and polyesters of fatty acids and
    (2) an alkali-soluble interpolymer of an ethylenically unsaturated carboxylic acid anhydride with a terminal ethylenically unsaturated copolymerizable monomer selected from the group consisting of vinyl ethers, vinyl esters and $\alpha$-olefins, said partial ester containing not more than about 5% of the carboxyl groups as ester groups.

12. A composition comprising a water-soluble partial ester of:
    (1) a micelle-forming hydroxyl-containing anionic surface active agent and
    (2) an alkali-soluble interpolymer of an ethylenically unsaturated carboxylic acid anhydride with a terminal ethylenically unsaturated monomer, selected from the group consisting of vinyl ethers, vinyl esters and $\alpha$-olefins, said partial ester containing not more than about 5% of the carboxyl groups as ester groups.

13. A composition as defined in claim 11 wherein the surface active agent is an alkylene oxide reaction product with an hydroxy compound.

14. A composition as defined in claim 13 wherein the surface active agent is an alkyl phenol-ethylene oxide condensate and the interpolymer is a vinyl methyl ether-maleic anhydride interpolymer.

15. A composition comprising a water-soluble partial ester of:
    (1) an hydroxyl-containing micelle-forming surface active agent selected from the group consisting of anionic surface active agents, alkylene oxide condensation products with an active hydrogen-containing hydrophobe, alkylolamine condensation products with fatty acids, alkylolamine condensation products with fatty esters, and glycol and polyesters of fatty acids and
    (2) an alkali-soluble interpolymer of an ethylenically unsaturated carboxylic acid anhydride with a terminal ethylenically unsaturated monomer selected from the group consisting of vinyl ethers, vinyl esters and $\alpha$-olefins,
said partial ester containing from about 0.1% to about 3% of the carboxyl groups present as ester groups.

16. A composition comprising a water-soluble partial ester of:
    (1) an hydroxyl-containing micelle-forming surface active agent selected from the group consisting of anionic surface active agents, alkylene oxide condensation products with an active hydrogen-containing hydrophobe, alkylolamine condensation products with fatty acids, alkylolamine condensation products with fatty esters, and glycol and polyesters of fatty acids and
    (2) an alkali-soluble interpolymer of an $\alpha,\beta$-unsaturated carboxylic acid anhydride with a terminal ethylenically unsaturated monomer selected from the group consisting of vinyl ethers, vinyl esters and $\alpha$-olefins,
said partial ester containing from about 0.1% to about 3% of the carboxyl groups present as ester groups.

17. A composition as defined in claim 16 wherein the anhydride is maleic anhydride and the monomer is an alkyl vinyl ether.

18. A composition comprising a water-soluble partial ester of:
    (1) a micelle-forming hydroxyl-containing non-ionic surface active agent selected from the group consisting of alkylene oxide condensation products with an active hydrogen-containing hydrophobe, alkylolamine condensation products with fatty acids, alkylolamine condensation products with fatty esters, and glycol and polyesters of fatty acids and
    (2) an alkali-soluble interpolymer of an ethylenically unsaturated carboxylic acid anhydride with a terminal ethylenically unsaturated copolymerizable monomer selected from the group consisting of vinyl ethers, vinyl esters and $\alpha$-olefins, said partial ester containing from about 0.1% to about 3% of the carboxyl groups as ester groups.

19. A composition comprising a water-soluble partial ester of:
    (1) a micelle-forming hydroxyl-containing anionic surface active agent and
    (2) an alkali-soluble interpolymer of an ethylenically unsaturated monomer selected from the group consisting of vinyl ethers, vinyl esters and $\alpha$-olefins, said partial ester containing from about 0.1% to about 3% of the carboxyl groups as ester groups.

20. A composition as defined in claim 18 wherein the surface active agent is an alkyl phenol-ethylene oxide condensate and the interpolymer is a vinyl methyl ether-maleic anhydride interpolymer.

References Cited by the Examiner
UNITED STATES PATENTS

| | | | |
|---|---|---|---|
| 2,892,736 | 6/1959 | Johnson et al. | 260—78.5 |
| 2,921,930 | 1/1960 | Suhrie | 260—78.5 |
| 3,004,958 | 10/1961 | Berens | 260—78.5 |

JOSEPH L. SCHOFER, *Primary Examiner.*

L. WOLF, L. G. CHILDERS, *Assistant Examiners.*